United States Patent [19]

Goto

[11] Patent Number: 5,278,851
[45] Date of Patent: Jan. 11, 1994

[54] SOLID-STATE LASER

[75] Inventor: Chiaki Goto, Kanagawa, Japan

[73] Assignee: Fuji Photo Film Co., Ltd., Kanagawa, Japan

[21] Appl. No.: 9,146

[22] Filed: Jan. 26, 1993

[30] Foreign Application Priority Data

Feb. 4, 1992 [JP] Japan .................. 4-019051

[51] Int. Cl.$^5$ .......................................... H01S 3/098
[52] U.S. Cl. ........................ 372/19; 372/98; 372/92; 372/39; 372/22; 372/21
[58] Field of Search ............ 372/19, 92, 22, 98, 372/21, 39

[56] References Cited

U.S. PATENT DOCUMENTS 4,656,635 4/1987 Baer et al. .
4,701,929 10/1987 Baer et al. .
5,187,714 2/1993 Okazaki et al. .................. 372/22

Primary Examiner—Léon Scott, Jr.
Attorney, Agent, or Firm—Sughrue, Mion, Zinn, Macpeak & Seas

[57] ABSTRACT

A solid-state laser having a laser resonator which includes an etalon to allow a single longitudinal mode of oscillation to occur in the width of the wavelength which permits the oscillation of the medium of the solid-state laser. The etalon is interposed in the resonator which is constituted of a surface of a resonant mirror and one end surface of a solid-state laser medium, and wherein the interval of the longitudinal modes of the etalon is set to be in the range from approximately one half to one width of the oscillation wavelength of the medium of a solid-state laser. At the same time, the ratio, with respect to the optical length, of the etalon to the resonator is selected to be about a half integer.

22 Claims, 5 Drawing Sheets

SOLID-STATE LASER

BACKGROUND OF THE INVENTION

1. Field of the Invention

This invention relates to a solid-state laser, and particularly to a solid-state laser including an etalon, incorporated in a resonator, to make a single longitudinal mode of oscillation in the width of the oscillation wavelength of the medium of the laser.

2. Description of the Prior Art

A laser diode pumping solid-state laser has already been known from, for instance, U.S. Pat. Nos. 4,656,635 and 4,701,929 in which a solid-state laser rod, which is doped with rare earth material such as neodymium, is pumped by a semiconductor laser (laser diode). In this type of solid-state laser, in order to suppress noise due to the mode competition, an etalon is disposed inside the resonator to achieve a single longitudinal mode of oscillation.

However, it has been hitherto admitted that the use of the etalon inside the cavity resonator, in such a manner as mentioned above, involves a considerable amount of increase in the threshold value of a pump power for the oscillation of a solid-state laser, thereby resulting in a drop in the output of the solid-state laser. The increase in the threshold value is attributed to the fact that the interval of longitudinal modes of an etalon is set to be large enough to make only one longitudinal mode of oscillation in the width of the oscillation wavelength of a solid-state laser medium.

SUMMARY OF THE INVENTION

In view of the foregoing observation and description, the primary object of this invention is to provide a solid-state laser which is capable of maintaining the threshold value of the pump power at a low level even when an etalon is disposed inside the resonator, and which can produce a high and stable output with less noise due to the mode competition.

To this end, according to one aspect of this invention, there is provided a solid-state laser in which a solid-state laser medium is pumped by means of a pump source, and which includes an etalon disposed in a laser resonator to make a single longitudinal mode of oscillation of the laser, wherein the improvement comprises:

the etalon having a longitudinal mode interval which is selected to be in the range of approximately one half to one width of the oscillation wavelength of the solid-state laser medium, and having an optical path length which is set so that the ratio of the optical path length of the laser resonator means to the optical path length of the laser resonator means is substantially a half integer, that is, an integer with a decimal fraction of 0.5.

According to another aspect of this invention, there is provided a solid-state laser in which a solid-state laser medium in a laser resonator is pumped by means of a pump source, the medium acting also as an etalon to make a single longitudinal mode of oscillation in the width of the oscillation wavelength of the solid-state laser medium, wherein the improvement comprises:

the solid-state laser medium having a longitudinal mode interval which is selected to be in the range of approximately one half to one width of the oscillation wavelength of the solid-state laser medium, and having an optical path length which is set so that the ratio of the optical path length of the laser resonator to the optical path length of the medium is substantially a half integer.

As mentioned above, when the interval of the longitudinal modes of the etalon is set to be in the range of approximately one half to one width of the oscillation wavelength of the solid-state laser medium, one or two longitudinal modes of the etalon are made in the aforementioned width of the oscillation wavelength. In this case, the threshold value of the pump power for the oscillation of the solid-state laser is increased to a much lesser extent when compared with the increase caused by no use of the etalon, thereby producing a high output.

When one longitudinal mode of the etalon is made in the width of the wavelength at which the solid-state laser medium can oscillate, this longitudinal mode of the etalon is coupled with one of the longitudinal modes of the resonator means, thereby effecting a single longitudinal mode of oscillation.

Meanwhile, if two longitudinal modes of the etalon are made in the width of the oscillation wavelength of the solid-state laser medium, and if one of the two longitudinal modes of the etalon is coupled with one of longitudinal modes of the resonator, the remaining longitudinal mode of the etalon is prevented from being coupled with other longitudinal modes of the resonator, because the ratio of the optical path length $nd_E$ of the etalon to the optical path length "Lop" of the resonator, that is, $Lop/nd_E$, is set substantially to a half integer.

Specifically, assume an optical wavelength $a$, the interval of the longitudinal modes of the resonator can be expressed as $$\Delta\lambda_L = \lambda^2/2Lop.$$

and the interval of the longitudinal oscillation modes of the etalon can be also expressed as $$\Delta\lambda_E = \lambda^2/2nd_E.$$

Hence, the ratio of the latter interval to the former interval will be obtained as $$\Delta\lambda_E/\Delta\lambda_L = Lop/nd_E$$

which is a half integer. Therefore, when one of the two longitudinal modes of the etalon is coupled with one of the longitudinal modes of the resonator, the other longitudinal mode of the etalon is positioned between other longitudinal modes of the resonator, thereby rendering the remaining longitudinal mode of the etalon uncoupled. Thus, even when two longitudinal modes are made in the width of the oscillation wavelength of the solid-state laser medium, the oscillation mode of the solid-state laser becomes a single longitudinal mode or approximately a single longitudinal mode.

As is evident from the above, when one longitudinal mode of the etalon is allowed to occur in the width of the oscillated wavelength of the solid-state laser medium, or when two modes are made, the oscillation mode of the solid-state laser becomes a single longitudinal mode or approximately a single longitudinal mode, whereupon noise resulting from the mode competition is suppressed, thereby ensuring a stable output of the solid-state laser.

DESCRIPTION OF THE PREFERRED EMBODIMENTS

Referring to the accompanying drawings, the principle of this invention will now be described in detail hereinbelow.

Figure 1:
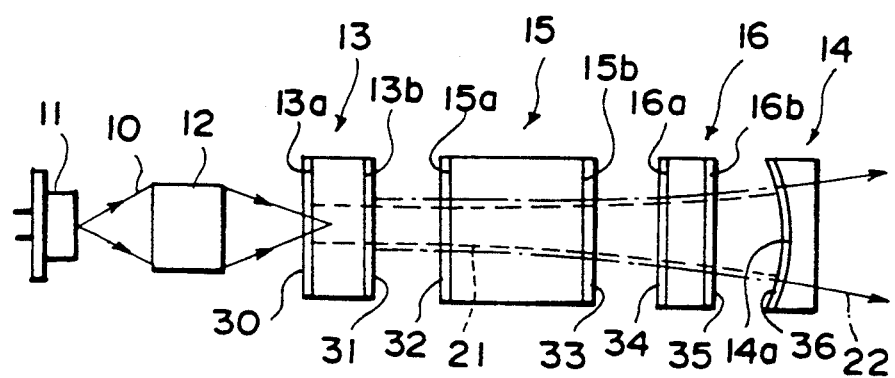
FIG. 1 is a schematic side view showing the structure of a solid-state laser according to a first embodiment of this invention.

FIG. 1 shows a laser-diode-pumped solid-state laser. This laser is composed of a semiconductor laser 11 (a phase-coupled array laser) for emanating a laser beam 10 as a pump beam; a condenser lens 12, for converging the laser beam 10 which is divergent rays, being composed of a rod lens, for instance; a YAG crystal 13 (hereinafter referred to as Nd:YAG crystal) which is doped with neodymium (Nd) and serves as a solid-state laser medium; a resonant mirror 14 being disposed in front of the Nd:YAG crystal 13, i.e., on the right side of the crystal 13; a KNbO$_3$ crystal 15 (hereinafter referred to as KN crystal) which is the crystal of a nonlinear optical material interposed between the Nd:YAG crystal 13 and the resonant mirror 14; and an etalon (quartz) 16 interposed between the KN crystal 15 and the resonant mirror 14. All of the elements set forth above are mounted in an integrated fashion within a common non-illustrated housing. Moreover, the temperature of the phase-coupled array laser 11 is regulated at a predetermined level by means of a non-illustrated Peltier element together with a non-illustrated temperature regulator.

In the first embodiment, employed as the phase-coupled array laser 11 is a laser which emits a laser beam at a wavelength of $\lambda_1 = 809$ nm. The Nd:YAG crystal 13 emanates a laser beam 21 at a wavelength of $\lambda_2 = 946$ nm when neodymium atoms are excited by the laser beam 10. This laser beam 21 enters the KN crystal 15, and is converted into a second harmonic wave 22 at a wavelength of $\lambda_3 = \lambda_2/2 = 473$ nm.

A rear (outer) end surface 13a and a front (inner) end surface 13b of the Nd:YAG crystal 13 are covered with a coating 30 and a coating 31, respectively; a rear end surface 15a and a front end surface 15b of the KN crystal 15 are covered with a coating 32 and a coating 33, respectively; a rear end surface 16a and a front end surface 16b of the etalon 16 are covered with a coating 34 and a coating 35, respectively; and a concave-shaped mirror surface 14a of the resonant mirror 14 is covered with a coating 36. The following table shows the behavior of each coating at wavelengths; $\lambda_1 = 809$ nm, $\lambda_2 = 946$ nm and $\lambda_3 = 473$ nm. In the table, AR designates no reflection (transmissivity of 99% or more); and HR, a high reflection (reflectivity of 99.9% or more).

TABLE

|  | $\lambda_1$ | $\lambda_2$ | $\lambda_3$ |
| --- | --- | --- | --- |
| coating 30 | AR | HR | — |
| coating 31 | — | AR | HR |
| coating 32 | — | AR | AR |
| coating 33 | — | AR | AR |
| coating 34 | — | — | AR |
| coating 35 | — | — | AR |
| coating 36 | — | HR | AR |

The coatings 30 through 36 cause the oscillation of the laser beam 21 between the end surface 13a of the Nd:YAG crystal 13 and the mirror surface 14a. Since the laser beam 21 is being oscillated when it enters the KN crystal 15, the crystal can properly absorb the laser beam, whereby a second harmonic wave 22 is efficiently produced. This second harmonic wave 22 straightly, or after it was reflected from the inner end surface 13b having the coating 31 of the Nd:YAG crystal 13, travels through the resonant mirror 14.

The following represent the distance "d", the refractive index "n" and the optical path length "nd" of each of the Nd:YAG crystal 13, the KN crystal 15, the etalon 16a, as well as an aggregate interval between these elements.

TABLE

|  | distance "d" (mm) | refractive index "n" | optical path length "nd" (mm) |
| --- | --- | --- | --- |
| Nd:YAG crystal | 1 | 1.823 | 1.823 |
| KN crystal | 5 | 2.238 | 11.190 |
| etalon | 0.838 | 1.451 | 1.216 |
| aggregate interval between the elements | 7.115 | 1.000 | 7.115 |

From this, the optical path length "Lop" of the resonator of the solid-state laser can be 21.344 mm, and the ratio of the optical path length "Lop" to the optical path length nd$_E$ of the etalon is about a half integer, that is, Lop/nd$_E$ = 21.344/1.216 = 17.55 .

In addition, the interval of longitudinal modes of the resonator is $\Delta\lambda_L = \lambda_2^2/2$Lop, and the interval of the longitudinal modes of the etalon 16 is $\Delta\lambda_E = \lambda_2^2/2$nd$_E$, and the ratio of the latter interval to the former interval, i.e., $\Delta\lambda_E/\Delta\lambda_L$, is subsequently equivalent to $Lop/nd_E$. This ratio is 17.55 as set forth in the above. Hence, the interval of the longitudinal modes of the etalon 16 is $\Delta\lambda_E=\lambda_2^2/2nd_E=946^2/2\times1.216\times10^6=0.370$ nm. This value is smaller than a width "W"=0.5 nm of the oscillation wavelength of the Nd:YAG crystal 13, but larger than half the same width. Here, the width W of the oscillation wavelength of the Nd:YAG crystal 13 is set to the foregoing value in this embodiment, though the value practically depends upon the pump power. With this value of interval and the wavelength width, as seen from FIGS. 2 and 3, only one or two longitudinal modes of the etalon are made in the width of the oscillation wavelength of the solid-state laser medium.

Figure 2:
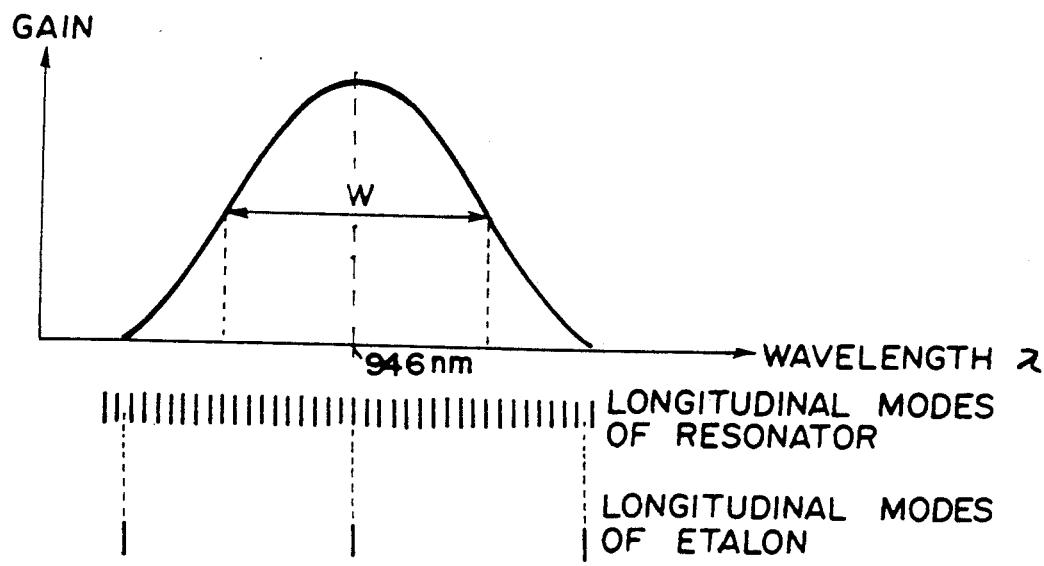
FIG. 2 is a plot illustrating an exemplary relationship, according to this invention, between the width of the oscillation wavelength of a solid-state laser medium, longitudinal modes of an etalon, and longitudinal modes of a resonator.

In the case of FIG. 2, when the longitudinal mode of the etalon, which is solely made in the width "W" of the oscillation wavelength of the Nd:YAG crystal 13, is coupled with one of the longitudinal modes of the resonator, the oscillation mode of the solid-state laser becomes a single longitudinal mode. Namely, in this case, since other longitudinal modes of the etalon adjacent to the coupled one are outside the width "W" of the wavelength, and also since $\Delta\lambda_E/\Delta\lambda_L$ is substantially a half integer, the adjacent longitudinal modes of the etalon are positioned between the longitudinal modes of the resonator, thereby deterring the coupling of the adjacent longitudinal modes of the etalon with the longitudinal modes of the resonator.

Figure 3:
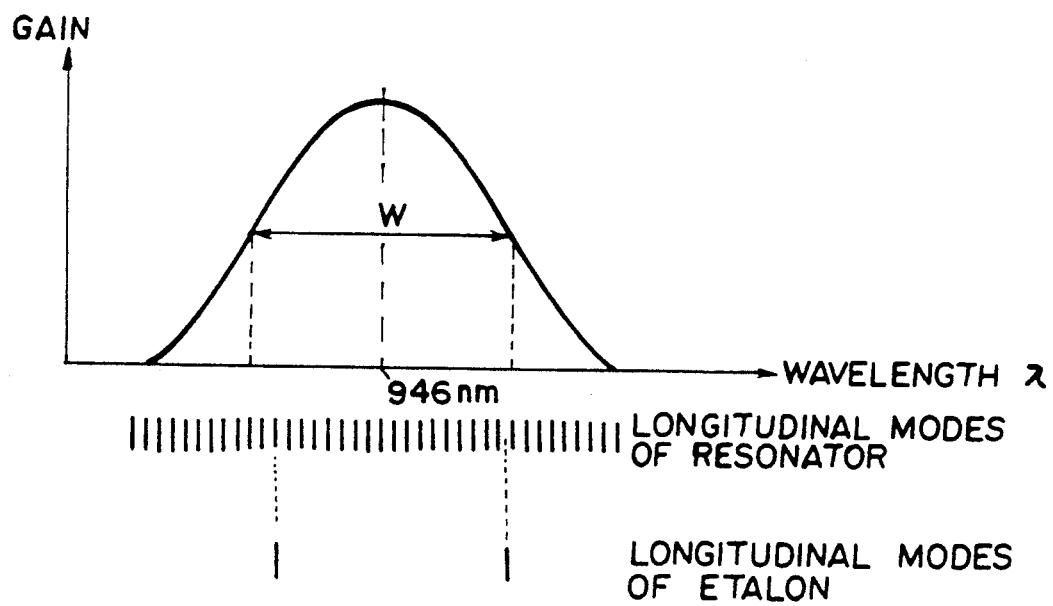
FIG. 3 is a plot illustrating another exemplary relationship, according to this invention, between the width of the oscillation wavelength of a solid-state laser medium, longitudinal modes of an etalon, and longitudinal modes of a resonator.

In the case where two longitudinal modes are made in the width W of the oscillation wavelength of the Nd:YAG crystal 13, as shown in FIG. 3, when one of the two longitudinal modes is coupled with one of the longitudinal modes of the resonator, the remaining mode of the etalon is positioned between the other longitudinal modes of the resonator, thereby ensuring only one coupling of a longitudinal mode between the etalon and the resonator.

As has been mentioned above, in the solid-state laser according to this invention, the etalon 16 allows only one longitudinal mode of oscillation to occur, thereby suppressing noise due to the mode competition and providing a solid-state laser beam 21 with a stable output. Moreover, the interval of the longitudinal modes of the etalon 16 is set to be somewhat smaller than the width "W" of the oscillation wavelength of the Nd:YAG crystal 13, whereupon the threshold value of the pump power for the oscillation of the solid-state laser is suppressed to a smaller extent, thereby producing a solid-state laser beam 21 with a high output. Thus, the solid-state laser, embodying this invention, can produce the second harmonic wave 22 whose output is high and stable.

This invention finds applications not only in the solid-state laser having the structure as set forth, but in other types of solid-state lasers. With reference to FIGS. 4 through 11, other embodiments of this invention will be described hereinbelow. The same reference numerals are provided to designate the corresponding features in FIG. 1, and explanation thereof will be omitted here for clarity. Among coatings illustrated in FIGS. 4 through 11 are those disposed in the resonator of the solid-state laser.

Figure 4:
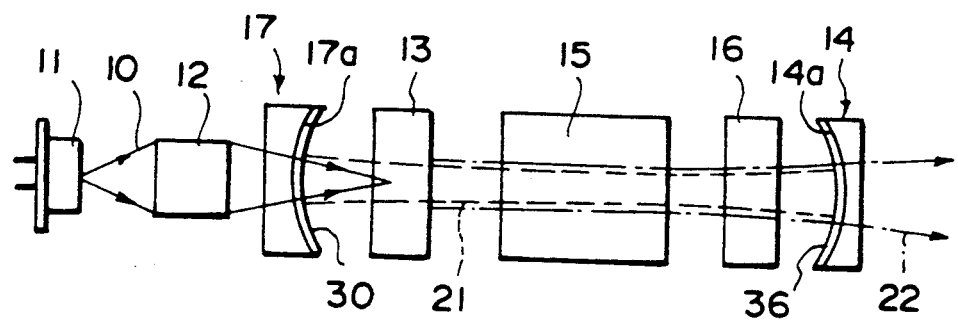
FIG. 4 is a schematic side view showing the structure of a solid-state laser according to a second embodiment of this invention.

In a second embodiment, shown in FIG. 4, a resonant mirror 17 is disposed between the condenser lens 12 and the Nd:YAG crystal 13, and a mirror surface 17a of the resonant mirror 17, the surface being most adjacent to the Nd:YAG crystal 13, is covered with a coating 30. This coating 30 is the same as that deposited on the rear end surface 13a of the Nd:YAG crystal 13 in the apparatus shown in FIG. 1. In this second embodiment, the resonator of the solid-state laser is constituted of the resonant mirrors 17 and 14.

Figure 5:
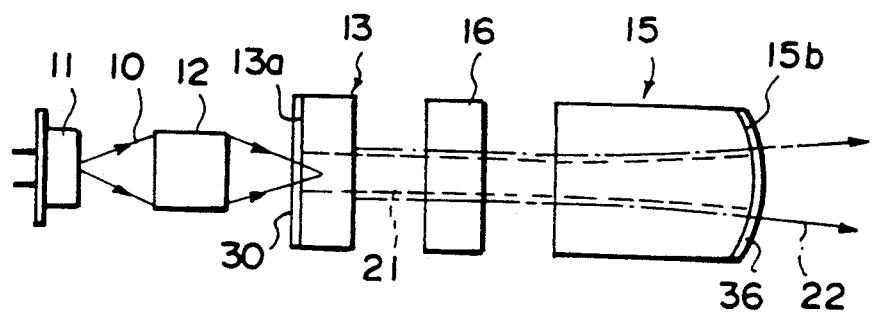
FIG. 5 is a schematic side view showing the structure of a solid-state laser according to a third embodiment of this invention.

In a third embodiment, shown in FIG. 5, an etalon 16 is interposed between the Nd:YAG crystal 13 and the KN crystal 15. A front end surface 15b of the KN crystal 15 is convexly shaped, and is covered with a coating 26. In this third embodiment, the resonator of the solid-state laser is made up of the rear end surface 13a of the Nd:YAG crystal 13 and the front end surface 15b of the KN crystal 15.

Figure 6:
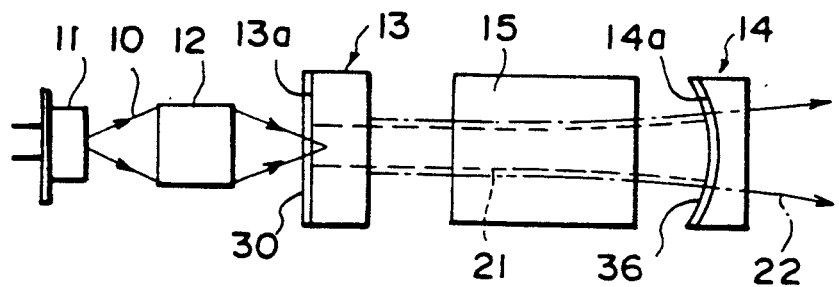
FIG. 6 is a schematic side view showing the structure of a solid-state laser according to a fourth embodiment of this invention.

In a fourth embodiment, shown in FIG. 6, the Nd:YAG crystal 13 is formed to have a predetermined thickness so that the crystal 13 can also act as the etalon.

Figure 7:
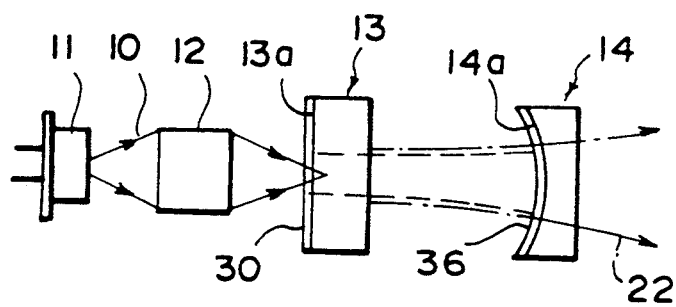
FIG. 7 is a schematic side view showing the structure of a solid-state laser according to a fifth embodiment of this invention.

In a fifth embodiment shown in FIG. 7, as with the fourth embodiment, the Nd:YAG crystal 13 also serves as the etalon. Since no wavelength conversion of the solid-state laser beam is carried out in the laser according to this embodiment, that is, no conversion of the wavelength of the laser beam into a shorter wavelength, a non-linear optical material is not positioned between the Nd:YAG crystal 13 and the resonant mirror 14.

However, in this embodiment, a solid-state laser crystal (a so-called Self-Frequency-Doubling Crystal) possessing a wavelength conversion function may be employed instead of the Nd:YAG crystal 13. As this type of the solid-state laser crystal, there are enumerated, for example, an NYAB crystal, an Nd:COANP crystal and an Nd:PNP crystal. By virtue of the use of such a solid-state laser crystal, the second harmonic wave 22 can be directly produced from the solid-state laser crystal.

Figure 8:
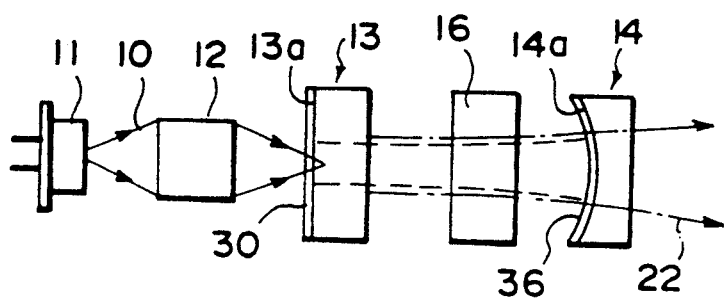
FIG. 8 is a schematic side view showing the structure of a solid-state laser according to a sixth embodiment of this invention.
Figure 9:
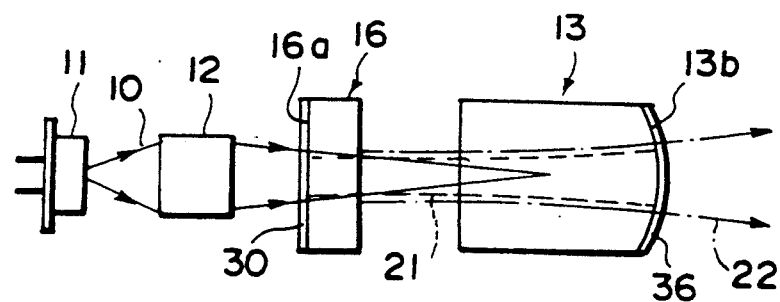
FIG. 9 is a schematic side view showing the structure of a solid-state laser according to a seventh embodiment of this invention.

Likewise, neither a sixth embodiment shown in FIG. 8, nor a seventh embodiment shown in FIG. 9 include the wavelength conversion of the solid-state laser beam. The sixth embodiment is similar to the first embodiment shown in FIG. 1 except that it is not provided with the KN crystal 15. Meanwhile, in the seventh embodiment, the resonator of the solid-state laser is composed of the front end convex surface 13b of the Nd:YAG crystal 13 and the rear end surface 16a of the etalon 16.

Figure 10:
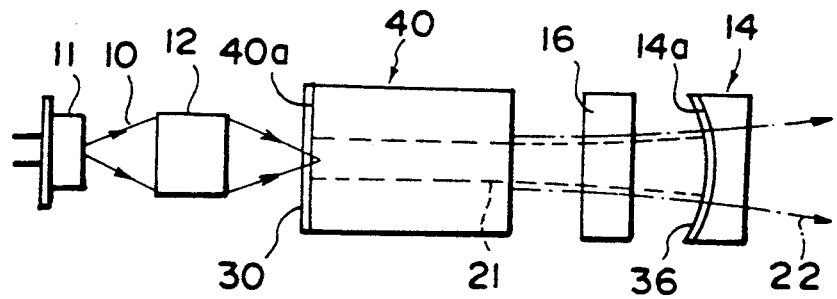
FIG. 10 is a schematic side view showing the structure of a solid-state laser according to an eighth embodiment of this invention.

An eighth embodiment, shown in FIG. 10, is different from the first embodiment shown in FIG. 1 in that a solid-state laser crystal 40 (a so-called Self-Frequency-Doubling Crystal) possessing a wavelength conversion function is employed instead of the Nd:YAG crystal 13 and the KN crystal 15. As the solid-state laser crystal 40, there are enumerated, for example, an NYAB crystal, an Nd:COANP crystal and an Nd:PNP crystal. By virtue of the use of such a solid-state laser crystal 40, the second harmonic wave 22 can be directly produced from the solid-state laser crystal 40.

Figure 11:
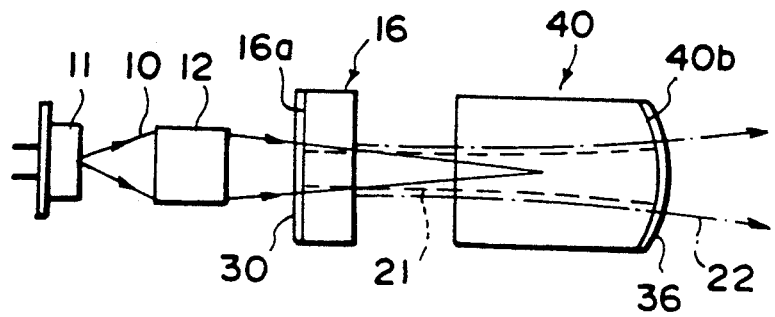
FIG. 11 is a schematic side view showing the structure of a solid-state laser according to a ninth embodiment of this invention.

A ninth embodiment, shown in FIG. 11, is provided with the above-mentioned solid-state laser crystal 40 and the etalon 16. The resonator of the solid-state laser is constituted of a front end surface 40b of the solid-state laser crystal 40 and the rear end surface 16a of the etalon 16.

The present invention is also applicable to solid-state lasers which produce a sum frequency or a difference frequency. As a matter of course, components of the aforementioned embodiments, such as the solid-state laser medium, the pump source for the laser medium, and the crystal of a non-linear optical material for use in wavelength conversion, may be replaced with appropriate corresponding elements other than those used in the above.

It will be understood that the above description of the present invention is susceptible to various modifications, changes, and adaptations and that the same are intended to be comprehended within the meaning and range of equivalents of the appended claims.

What is claimed is:

1. A solid-state laser in which a solid-state laser medium is pumped by means of a pump source, and which includes an etalon disposed in a laser resonator to make a single longitudinal mode of oscillation, wherein the improvement comprises:

the etalon having a longitudinal mode interval which is selected to be in the range of approximately one half to one width of the oscillation wavelength of the solid-state laser medium, and having an optical path length which is set so that the ratio of the optical path length of the laser resonator to the optical path length of the etalon is substantially a half integer.

2. A solid-state laser as defined in claim 1, wherein the laser resonator is constituted of a solid-state laser medium, the crystal of a non-linear optical material and a resonant mirror, and wherein the etalon is disposed between the crystal of a non-linear optical material and the resonant mirror.

3. A solid-state laser as defined in claim 2, wherein the solid-state laser medium is an Nd:YAG crystal, and the crystal of the non-linear optical material is a $KNbO_3$ crystal.

4. A solid-state laser as defined in claim 1, wherein the laser resonator is constituted of a pair of resonant mirrors, each being disposed at opposite ends, the solid-state laser medium, and the crystal of a non-linear optical material, and wherein the etalon is disposed between the crystal of the non-linear optical means and the foremost end resonant mirror.

5. A solid-state laser as defined in claim 4, wherein the solid-state laser medium is an Nd:YAG crystal, and the crystal of the non-linear optical material is a $KNbO_3$ crystal.

6. A solid-state laser as defined in claim 1, wherein the laser resonator is constituted of a solid-state laser medium and the crystal of a non-linear optical material with the etalon disposed between the solid-state laser medium and the crystal of a non-linear optical material, and wherein the crystal of the non-linear optical material is, at the foremost end thereof, convexly shaped.

7. A solid-state laser as defined in claim 6, wherein the solid-state laser medium is an Nd:YAG crystal, and the crystal of the non-linear optical material is a $KNbO_3$ crystal.

8. A solid-state laser as defined in claim 1, wherein the laser resonator is constituted of a solid-state laser medium and a resonant mirror, and the etalon is interposed between the solid-state laser medium and the resonant mirror.

9. A solid-state laser as defined in claim 8, wherein the solid-state laser medium is an Nd:YAG crystal.

10. A solid-state laser as defined in claim 8, wherein the solid-state laser medium is a self-frequency-doubling crystal.

11. A solid-state laser as defined in claim 10, wherein the self-frequency-doubling crystal is selected from the group consisting of an NYAB crystal, an Nd: COANP crystal and an Nd:PNP crystal.

12. A solid-state laser as defined in claim 1, wherein the laser resonator is constituted of a combination of the etalon and the solid-state laser medium, and the solid-state laser medium is, at a foremost end thereof, convexly shaped.

13. A solid-state laser as defined in claim 12, wherein the solid-state laser medium is an Nd:YAG crystal.

14. A solid-state laser as defined in claim 12, wherein the solid-state laser medium is a self-frequency-doubling crystal.

15. A solid-state laser as defined in claim 14, wherein the self-frequency-doubling crystal is selected from the group consisting of an NYAB crystal, an Nd: COANP crystal and an Nd:PNP crystal.

16. A solid-state laser in which solid-state laser medium in a laser resonator means is pumped by means of a pump source, the medium acting also as an etalon to make a single longitudinal mode of oscillation, wherein the improvement comprises:

the solid-state laser medium having a longitudinal mode interval which is selected to be in the range of approximately one half to one width of the wavelength which permits the oscillation of the solid-state laser medium, and having an optical path length which is set so that the ratio of the optical path length of the laser resonator to the optical path length of the medium is substantially a half integer.

17. A solid-state laser as defined in claim 16, wherein the laser resonator is constituted of a solid-state laser medium, the crystal of a non-linear optical means and a resonant mirror, and the medium of the solid-state laser is formed to have such a predetermined thickness that the medium can also act as an etalon.

18. A solid-state laser as defined in claim 17, wherein the solid-state laser medium is an Nd:YAG crystal, and the crystal of the non-linear optical material is a $KNbO_3$ crystal.

19. A solid-state laser as defined in claim 16, wherein the laser resonator is constituted of a solid-state laser medium and a resonant mirror, and the solid-state laser medium is formed to have a predetermined thickness such that the medium can also serve as an etalon.

20. A solid-state laser as defined in claim 19, wherein the solid-state laser medium is a self-frequency-doubling crystal.

21. A solid-state laser as defined in claim 10, wherein the self-frequency-doubling crystal is selected from the group consisting of an NYAB crystal, an Nd: COANP crystal and an Nd:PNP crystal.

22. A solid-state laser as defined in claim 19, wherein the medium of the solid-state laser is an Nd: YAG crystal.

* * * * *